(12) United States Patent
Hrvatinic et al.

(10) Patent No.: US 12,214,793 B2
(45) Date of Patent: Feb. 4, 2025

(54) CONTROLLING MOTION OF A VEHICLE

(71) Applicant: Rimac Technology LLC, Sveta Nedelja (HR)

(72) Inventors: Kruno Hrvatinic, Zagreb (HR); Sandor Iles, Zagreb (HR); Ajinkya Krishnakumar, Zagreb (HR); Jadranko Matusko, Zagreb (HR); Bojan Spahija, Zagreb (HR); Marko Svec, Sveta Nedjelja (HR)

(73) Assignee: Rimac Technology LLC, Sveta Nedelja (HR)

( * ) Notice: Subject to any disclaimer, the term of this patent is extended or adjusted under 35 U.S.C. 154(b) by 272 days.

(21) Appl. No.: 17/857,805

(22) Filed: Jul. 5, 2022

(65) Prior Publication Data
US 2023/0001935 A1 Jan. 5, 2023

(30) Foreign Application Priority Data
Jul. 5, 2021 (EP) .................................... 21183752

(51) Int. Cl.
*B60W 50/00* (2006.01)
*B60W 40/114* (2012.01)
*B60W 30/18* (2012.01)

(52) U.S. Cl.
CPC ...... *B60W 50/0097* (2013.01); *B60W 40/114* (2013.01); *B60W 30/18172* (2013.01); *B60W 2050/0028* (2013.01); *B60W 2520/10* (2013.01); *B60W 2520/12* (2013.01); *B60W 2520/14* (2013.01); *B60W 2520/28* (2013.01); *B60W 2540/10* (2013.01); *B60W 2540/12* (2013.01); *B60W 2720/14* (2013.01); *B60W 2720/30* (2013.01)

(58) Field of Classification Search
CPC ......... B60W 30/18172; B60W 40/114; B60W 50/0097; B60W 2050/0028; B60W 2520/10; B60W 2520/12; B60W 2520/14; B60W 2520/28; B60W 2540/10; B60W 2540/12; B60W 2720/14; B60W 2720/30
See application file for complete search history.

(56) References Cited

U.S. PATENT DOCUMENTS

| | | | |
|---|---|---|---|
| 9,318,023 B2* | 4/2016 | Moshchuk | ............ B60W 10/18 |
| 10,407,035 B1 | 9/2019 | Gadda et al. | |
| 10,829,149 B1 | 11/2020 | Garimella et al. | |
| 11,731,654 B2* | 8/2023 | Suissa | ................. B60T 8/17555 |
| | | | 701/25 |
| 2018/0297587 A1 | 10/2018 | Kasaiezadeh Mahabadi et al. | |
| 2020/0122700 A1* | 4/2020 | Abaziou | ................. G01P 3/489 |
| 2020/0142405 A1 | 5/2020 | Havens et al. | |

* cited by examiner

*Primary Examiner* — Hung Q Nguyen
*Assistant Examiner* — Mark L. Greene
(74) *Attorney, Agent, or Firm* — Seed IP Law Group LLP

(57) ABSTRACT

A method for controlling motion of a vehicle, the method comprising the steps of: obtaining input information on a vector related to the velocity of said vehicle; computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the at least one wheel for controlling the motion of said vehicle.

7 Claims, 3 Drawing Sheets

CONTROLLING MOTION OF A VEHICLE

TECHNICAL FIELD

The present invention relates to controlling motion of a vehicle.

TECHNICAL BACKGROUND

Conventionally, steering a vehicle according to the commands given by the driver and controlling the vehicle in case the vehicle risks to get off course due to skidding or a high yaw rate are taken care of separately. While such an approach might provide advantages in some scenarios or might even be required in some cases, this is by no means a necessity. In fact, such a modular approach in driving the vehicle as desired by the driver and keeping the vehicle on course are almost independent from each other, but definitely not considered as two aspects of the same concept, makes it impossible to realize a vehicle motion control in which the synergistic capabilities of combining the various aspects of motion of a vehicle are used.

However, with the advent of vehicles that are driven entirely electrically, these concepts may be overturned and replaced by a more holistic approach in which such a synergistic combination can be realized.

Moreover, in conventional approaches the steering of the vehicle is oftentimes exclusively based on feedback control, that is, past data is considered and only differences between measured and desired values are used to control the motion of the vehicle. However, this approach has the clear disadvantage that it is a merely reactive approach without any proactive aspect to it that would allow to include predictions about the possible future trajectory of the vehicle to influence the control of the motion.

SUMMARY

The above problems are solved by the subject-matter of the independent claims. Further preferred embodiments are given by the subject-matter of the dependent claims.

According to an embodiment of the present invention, there is provided a method for controlling motion of a vehicle, the method comprising the steps of: obtaining input information on a vector related to the velocity of said vehicle; computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the at least one wheel for controlling the motion of said vehicle.

According to a further embodiment of the present invention, there is provided a vehicle configured to execute a method for controlling motion of said vehicle, the method comprising the steps of: obtaining input information on a vector related to the velocity of said vehicle; computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the least one wheel for controlling the motion of said vehicle.

Accordingly to a further embodiment of the present invention, there is provided a device configured to execute a method for controlling motion of a vehicle, the method comprising the steps of: obtaining input information on a vector related to the velocity of said vehicle; computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the at least one wheel for controlling the motion of said vehicle.

According to a further embodiment of the present invention, there is provided a device comprising an interface to a vehicle, said vehicle providing input information on a vector related to the velocity of said vehicle to said device via said interface, said device configured to: compute repeatably a future trajectory of said vehicle based on said input information and trial torques to be applied to at least one wheel of said vehicle for optimizing said future trajectory in view of a target vehicle motion, thereby obtaining target trial torques; output the obtained target trial torques to said vehicle to be applied to the at least one wheel for controlling the motion of said vehicle.

Embodiments of the present invention improve the dynamic performance and drivability of the vehicle. It increases the maximum achievable lateral acceleration and yaw rate, improves vehicle controllability and stability. It speeds up vehicle lateral response to steering wheel inputs, improves steady state and transient response.

Moreover, in electric vehicles, steering and accordingly also control of the motion of each wheel can be realized individually without any further development, thus electric vehicles are a particular good platform for the use of the present invention.

BRIEF DESCRIPTION OF THE DRAWINGS

Embodiments of the present invention, which are presented for better understanding the inventive concepts, but which are not to be seen as limiting the invention, will now be described with reference to the figures in which.

DETAILED DESCRIPTION

Figure 1:
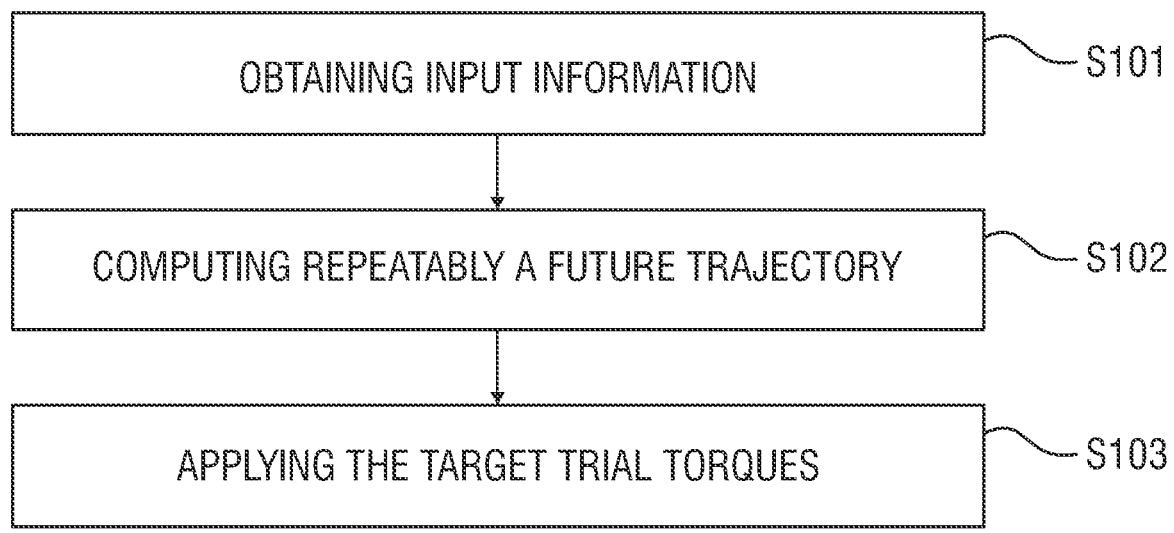
FIG. 1 shows a flowchart of general method embodiments of the present invention.

FIG. 1 shows a flowchart of general method embodiments of the present invention. A method for controlling motion of a vehicle according to the present invention comprises the steps of obtaining input information (S101) on a vector related to the velocity of said vehicle; computing repeatably a future trajectory (S102) of said vehicle based on said input information and trial torques to be applied to at least one wheel of said vehicle for optimizing said future trajectory in view of a target vehicle motion, thereby obtaining target trial torques; and applying the obtained target trial torques (S103) to the at least one wheel for controlling the motion of said vehicle.

In the context of this application motion refers to all types of movement of the vehicle, that is, includes acceleration and deceleration of the vehicle as well as braking the vehicle and changing the direction of the vehicle and is thus not to be understood to limit the type of movement of the vehicle.

The first step of obtaining input information may be realized in various ways. For example, the information may either be sensed or measured by the vehicle. Alternatively, the information may be obtained from the outside, for example, by a GPS signal or a similar signal. At least part of this information may also be provided by signals from another entity, for example a vehicle, e.g. may make use of vehicle-to-vehicle communication.

Further, the input information on a vector related to the velocity of said vehicle may take various forms. For example, it might be that said vector comprises a velocity and a vehicle yaw rate. It might also be obtained independently, that is, the velocity of the vehicle is obtained by different means and/or a different source than the vehicle yaw rate. The information might be obtained directly, that is, information directly about the velocity and the yaw rate or indirectly, that is, information from which velocity and yaw rate can be deduced. For example, instead of obtaining velocities and yaw rate, positions and yaw angles may be obtained and corresponding derivatives may be computed to obtain the velocities resp. the yaw rate. Furthermore, the information is not limited and might contain further information relevant to the control of the motion of the vehicle. Examples for such information may be a yaw rate, a yaw angle, a lateral velocity, a longitudinal velocity, wheel speeds (also angular velocities) of at least one of the wheels of the vehicle, a steering wheel angle, lateral acceleration as well as longitudinal acceleration. It is clear that this list is not conclusive and that any quantity that can be used for the motion control of the vehicle may be included in this information.

For example, the vector related to the velocity of said vehicle may comprise at least two of: a transversal velocity of said vehicle, a longitudinal velocity of said vehicle, a yaw rate of said vehicle, and a ratio of the transversal velocity of said vehicle and the longitudinal velocity of said vehicle or any derivative or integrated quantity of the above quantities. In other words, as can be appreciate by the skilled person, instead of using a velocity, an acceleration may be used and velocity may be obtained by integration. Equally, any quantity that is substantially the same as one of the above quantities or contains substantially the same information may be used. For example, a square of a velocity may be used instead of In a further example, said input information may further comprise a motion target of said vehicle. Herein, motion target refers, for example, to the input provided by the driver, which may be provided via the gas pedal and the breaking pedal. Alternatively, in a scenario involving autonomous driving, a motion target may be the input provided by the autonomous driving agent before the control provided by the present invention is executed. In other words, a motion target may refer to an intent regarding the motion of the vehicle.

In another example based on the above, said input information may further comprise respective angular velocities of all four wheels of the vehicle and a yaw rate of said vehicle, and optimizing said future trajectory may include controlling said yaw rate of said vehicle.

The second step of repeatably computing a future trajectory of said vehicle can be realized by a plethora of algorithms and is not limited to a particular algorithm or procedure. This algorithm may be based on said input information and trial torques to be applied to at least one wheel of said vehicle. The trial torques can be a first guess of the torque to be applied and may be based on several consideration. For example, it might be based on a previously applied torque or even based on a feedback loop calculation.

It is noted computing the future trajectory may include past data, that is, may be based on results from measurements and/or may be based on previous results of the method applied at a previous time. It is thus clear that the method can be applied iteratively, and that each iteration may be used for the next iteration.

Further, the duration of the future trajectory is variable and can be chosen according to various requirements. For example, a longer duration may likely lead to a longer calculation time making the requirement of real-time analysis more challenging. As all these decisions might also depend on each iteration of the step of repeatably computing the future trajectory, it might be appropriate that this parameter can be changed for each iteration of computing the trajectory.

The optimization aspect of this step may take various forms. A possible approach is that the computed future trajectory is compared with a target trajectory, that is, a target vehicle motion, and it is then determined whether the future trajectory meets the requirements, e.g. is close enough to a target trajectory or not. If this is the case, the optimization is finished, and the trial torques are taken to be the target trial torques. If this is not the case, that is, the computed future trajectory does not correspond to a target trajectory with sufficient accuracy, the trial torques are modified and the computation is repeated. In particular, the modification of the trial torques may be based on the difference between the computed future trajectory and the target trajectory. Such a difference may be computed in different ways, for example both trajectories may be written as a vector and then the distance between these vectors may be calculated using an appropriate norm.

Alternatively, such an evaluation may involve further parameters than merely the trajectory itself. By using a cost function in which several parameters that are relevant for the motion of the vehicle and the control of the same can be considered. Possible other parameters involved may be an error in motion target, for example a yaw rate error, a force request error, that is, a deviation between the applied force according to the commands by the driver and the force to be applied according to the computed future trajectory, one or more slack variables to limit the slip ratio as well as parameters to limit the inputs. These different parameters may be weighted differently with respect to each other and these difference in weights may be changed according to the situation. For example, different driving style.

However, this is merely an example and in no way understood to be limiting. Any procedure that allows to determine whether the computed future trajectory is sufficient for the next step of controlling the motion, thus obtaining the target trial torque, and—in case the computer future trajectory is not sufficient—to determine new trial torques is enough for this aspect.

In the third step, the obtained target trial torques are applied to the at least one wheel for controlling the motion of said vehicle.

Here it is noted that the concept of computing a future trajectory may include that the trial torque is not a single value, for example, per wheel, but instead a time-series of trial torques, for example, per wheel. The first trial torque of this time-series of trial torques corresponds to the torque to be applied to the at least one wheel for controlling the motion of said vehicle. The remaining ones, as they refer to target trial torques to be applied in the future, may be used for as trial torques for the next iteration of the method.

In an embodiment of the present invention, the second step of obtaining the target trial torques may include the following sub-steps:

In a first sub-step, a future trajectory of the vehicle is computed based on said input information and trial torques to be applied to at least one wheel.

In a second sub-step, the computed future trajectory is evaluated in view of a target vehicle motion.

In a third sub-step, if the evaluation indicates that the target vehicle motion is not optimal, the trial torques are adjusted according to the evaluation and a further iteration is started at sub-step 1; if the evaluation indicates that the target vehicle motion is optimal, the trial torques are set as the target trial torques.

Figure 2:
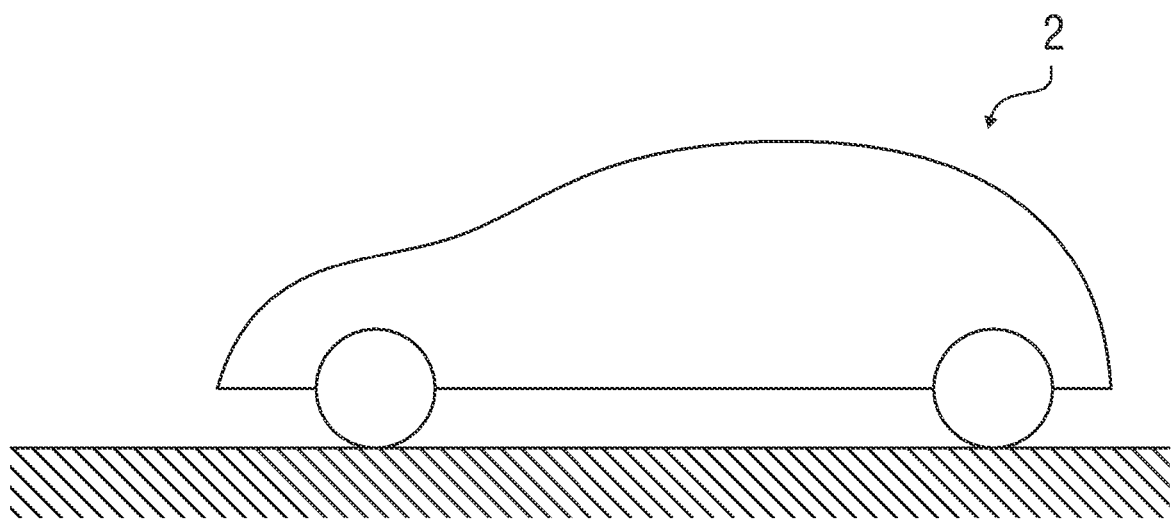
FIG. 2 shows a schematic view of a vehicle configured to execute general motion control method of the present embodiment.

FIG. 2 shows a schematic view of a vehicle 2 configured to execute general motion control method of the present embodiment. This method corresponds substantially to the method discuss above, that is the vehicle is configured to execute a method comprising the steps of: obtaining input information (S101) on a vector related to the velocity of said vehicle; computing repeatably a future trajectory (S102) of said vehicle based on said input information and trial torques to be applied to at least one wheel of said vehicle for optimizing said future trajectory in view of a target vehicle motion, thereby obtaining target trial torques; and applying the obtained target trial torques (S103) to the at least one wheel for controlling the motion of said vehicle.

Accordingly, the above considerations in connection with the method discussed in connection with FIG. 1 equally applies to the vehicle configured to execute such a method.

Figure 3:
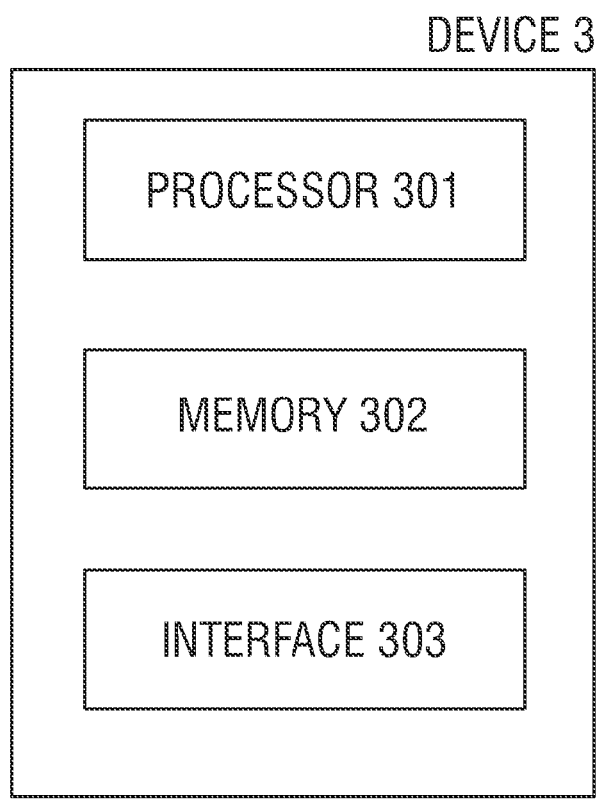
FIG. 3 shows a schematic view of a device embodiment of the present invention.

FIG. 3 shows a schematic view of a device embodiment of the present invention. This device 3 may comprise a processor 301 as well as a memory 302. The processor may be Central Processing Unit (CPU) or a Graphical Processing Unit (GPU). Using a GPU may be advantageous for some optimization algorithms. Furthermore, it may optionally also comprise an interface 303. These elements may be configured to exchange data with each other, that is, the processor 301 may receive data from both the memory 302 and the interface 303 that is then processed by the processor 301. Accordingly, the memory 302 may receive and/or provide the processor 301 with data, that is, processed data resp. to-be-processed data. Further, the memory may also receive and/or provide the interface 303 with data. In line therewith, the interface 303 may provide and/or receive data from the processor 301 which then is to-be-processed data or processed data and may provide and/or receive data from the memory 302.

A device 3 as schematically shown in FIG. 3 may be configured to execute a method for controlling motion of a vehicle, the method comprising the steps of: obtaining input information (S101) on a vector related to the velocity of said vehicle; computing repeatably a future trajectory (S102) of said vehicle based on said input information and trial torques to be applied to at least one wheel of said vehicle for optimizing said future trajectory in view of a target vehicle motion, thereby obtaining target trial torques; and applying the obtained target trial torques (S103) to the at least one wheel for controlling the motion of said vehicle.

In this case, the device 3 can be considered to be an integral part of the vehicle 1.

Alternatively, the device 3 schematically shown in FIG. 3, in particular in the case of the device comprising the interface 3, it might be the case that it is said vehicle that provides input information (S101) on a vector related to the velocity of said vehicle to said device via said interface, and said device is configured to: compute repeatably a future trajectory (S102) of said vehicle based on said input information and trial torques to be applied to at least one wheel of said vehicle for optimizing said future trajectory in view of a target vehicle motion, thereby obtaining target trial torques; and output the obtained target trial torques (S103) to said vehicle to be applied to the at least one wheel for controlling the motion of said vehicle.

In this case, the device 3 might be considered to be a modular part of the vehicle 1 as the device 3 is provided with the input information by the vehicle 1 and thus not obtained it on its own.

In the following, a further embodiment of the present invention will be described in detail. This embodiment comprises three components: a yaw rate target calculation, a Model Predictive Control (MPC) problem formulation and a Quadratic Problem Solver.

The yaw rate target calculation component calculates a yaw rate target based on a current state of the vehicle 1, for example through a lookup table. Calculation using a lookup table may provide a faster calculation than an online calculation.

The MPC problem formulation component creates a model predictive control problem suited to the vehicle's current state and desired behavior. This problem can be formulated as a finite horizon open-loop optimal control problem, which is passed to the Quadratic Program Solver for solving.

The Quadratic Program Solver component calculates the torque commands, that is the target trial torques, to be applied to the vehicle, that is, at least one of the wheels of the vehicle. Current control action is obtained by solving the finite horizon open-loop optimal control problem. The optimization returns an optimal control sequence. The first control in this sequence is applied to the vehicle.

Yaw rate targets may be obtained by a lookup table. The table is two-dimensional, with steering wheel angle and vehicle longitudinal velocity as inputs and reference yaw rate as output, that is:

$$\dot{\psi}_k^{ref} = f(\delta, v_x)$$

The data for the reference table (lookup table) is generated offline, for example by performing a steady state analysis on the passive vehicle in simulation. For example, a slowly increasing longitudinal speed is applied at different constant steering angles, and the measured yaw rate is recorded as the steady-state passive yaw rate value.

In a further detailed embodiment, the resulting steady-state passive yaw rate values are multiplied by a factor to produce yaw rate targets different from the vehicle passive behavior. Smaller factors are used for higher speeds, where vehicle instability is more dangerous.

Furthermore, in the present embodiment it may be necessary to be aware of the vehicle's current state to be able to determine optimal wheel torques. The vehicle's current state may be a set of measurements or estimates which enable the system to specify initial conditions for its internal vehicle model.

The following values may comprise the vehicle state: Current estimated vehicle longitudinal velocity, current estimated vehicle lateral velocity, current measured vehicle yaw rate, wheel rotational velocity (one per wheel).

In a further embodiment, the discrete nonlinear vehicle model used for the MPC is given by:

$$\hat{\xi}(k+1) = f_d(\xi(k), u(k))$$

The Linear Time Varying (LTV) MPC implemented in this embodiment uses a linear vehicle model approximated by the following equation:

$$\xi(k+1)=A_k\xi(k)+B_k u(k)+d_k$$

where ξ(k) is the vehicle model state vector and u(k) is the input vector at the time step k, with t being the current time step. The prediction horizon is represented by N. Accordingly, $$\xi=[v_x,v_y,\dot{\psi},\omega_{fl},\omega_{fr},\omega_{rl},\omega_{rr}]^T$$

$$u=[\delta,T_{fl},T_{fr},T_{rl},T_{rr}]^T$$

$$k=t,\ldots,t+N-1$$

Here, ξ is the steering wheel angle and wheel torques are denoted by $T_{\bullet\star}$ where marking $\bullet\in\{f,r\}$ represents front or rear wheel values, while marking $\star\in\{l,r\}$ represents left or right wheel values. While this assumes a vehicle with four wheels, front and rear, left and right, this is by no means limiting.

In fact, the present embodiment is not limited to such a scenario and this is merely used for ease of understanding.

The vehicle model used inside this embodiment is linearized once every algorithm iteration, for every time step in the prediction horizon. This produces a set of similar linear models—one for every time step—which can together be viewed as one Linear Time-Varying model (LTV model). The optimization algorithm uses the LTV model to arrive at optimal torque values.

The model may be linearized around the most likely operating point at that time step. When Torque Vectoring first initializes, the most likely operating point for the future is the current operating point, so that value is used for all time steps. Once an optimal state trajectory is available (having been calculated in a previous algorithm iteration), it may be used to linearize the model around.

The model may be linearized before optimization starts, and it may not be re-linearized when the predicted optimal trajectory changes. This may be acceptable because the optimal trajectory changes should be small when comparing consecutive algorithm iterations.

As the model used in this MPC must be linear, the matrices $A_k$ and $B_k$ are obtained by successively linearizing the nonlinear vehicle model along a predicted state trajectory. States and inputs are predicted at each time step and the predicted values are then used for further predictions throughout the horizon.

$$A_k=\frac{\partial f_d}{\partial \xi}|_{\xi_k,u_k|_{t-1}}$$

$$B_k=\frac{\partial f_d}{\partial u}|_{\xi_k,u_k|_{t-1}}$$

$d_k$ represents the predicted steady state response deviation of the non-linear model from the LTV model:

$$d_k=\hat{\xi}(k+1)=A_k\hat{\xi}(k)-B_k u(k)$$

An LTV model of the vehicle may be used to calculate the change in states produced by a change in inputs. However, the present embodiment may require the actual value of the states to compare with reference values. If the LTV model were simulated, its output may not exactly match the output of the nonlinear model, so a set of correction "delta" values are calculated.

In the present embodiment, the delta values may be calculated once per algorithm iteration, after the system has been linearized. These delta values are then kept constant for all optimization iterations.

The delta value is calculated by simulating the full nonlinear model over the prediction horizon. Then, for each time step, the LTV model is initialized to the nonlinear state values, the input values for that time step are applied and the state values for the next time step according to the LTV model are calculated. The difference between the nonlinear state values for the next time step and the LTV state values for the next time step are the delta values for this time step.

Once calculated, the delta values are used in the objective function of the optimal control problem. At each time step, the delta values act as a known disturbance to align the predicted state to the nonlinear simulated state. If the system inputs do not change, the LTV model and the nonlinear model will match perfectly.

The model used may be a dual-track bicycle model with nonlinear tyres, weight transfer effects and wheel dynamics. The coordinate system is chassis-fixed, and the position of the vehicle is not tracked.

Equal steering angle is assumed on front left and front right wheel, and the model does not account for static toe on any of the wheels.

Wheel slip is calculated the same way in both braking and acceleration, using the following equation:

$$\sigma=\frac{\omega r-v_x}{v_x}$$

The equation may not support operation under very low speed, which may be justified because the present embodiment should not be required to be active at very low speed.

The model may include simple load transfer behavior with no dynamics. Lateral load transfer is assumed to be split evenly between the front and rear axle, and it is calculated purely from lateral acceleration. Longitudinal load transfer is calculated purely from longitudinal acceleration.

Load transfer is calculated using the equations below:

$$F_{z,fl}=\frac{mgb}{l}-\frac{a_x h}{2l}-\frac{a_y h}{4c}$$

$$F_{z,fr}=\frac{mgb}{l}-\frac{a_x h}{2l}+\frac{a_y h}{4c}$$

$$F_{z,rl}=\frac{mgc}{l}+\frac{a_x h}{2l}-\frac{a_y h}{4c}$$

$$F_{z,rr}=\frac{mgc}{l}+\frac{a_x h}{2l}+\frac{a_y h}{4c}$$

Since the model accepts wheel torque as an input, it has a model of wheel dynamics. The model assumes a fixed wheel radius and inertia and does not account for rolling resistance. Wheel dynamics for each individual wheel is described by the equation below:

$$J\frac{d\omega}{dt}=T-rF_x$$

Aerodynamic drag, downforce and torque may not be modelled.

The goal at each step is to find the optimal control sequence along the horizon which minimizes a cost function. This cost function may for example take the following form:

$$J(t) = \sum_{k=t}^{t+N} \left( q\|\dot{\psi}_k - \dot{\psi}_k^{ref}\|^2 + w\|f_k - f_k^{ref}\|^2 + p\|\varepsilon_k\|_I^2 \right) + \sum_{k=t}^{t+N-1} \left( \|u_k\|_S^2 + \|\Delta u_k\|_R^2 \right)$$

The first part of the cost function $(q\|\dot{\psi}_k - \dot{\psi}_k^{ref}\|^2)$ is the yaw rate tracking squared error weighted by the scalar q.

Second part $(w\|f_k - f_k^{ref}\|^2)$ is the force request tracking squared error weighted by the scalar w.

Third part $(p\|\varepsilon_k\|_I^2)$ is the square of the slack variable vector $\varepsilon_k$ multiplied by the identity matrix I and weighted by the scalar p The last part is the cost of input variables: $\|u_k\|_S^2$ penalizes the squared value of inputs weighted with S matrix, while $\|\Delta u_k\|_R^2$ penalizes the squared value of input change weighted with R matrix.

Slack variables may be used for penalizing when a variable breaks its soft constraint. Example, we want to limit slip ratio:

slip≤slip_limit or slip−slip_limit≤0

In an optimization problem, the equations above would be considered hard constraints which means that if the inequality cannot be satisfied, the problem is infeasible.

Since there may be indirect control over slips, it is possible that the limits will get broken and we want to penalize if the value goes above the limits. To achieve that, slack variables are added in the soft constraint inequations:

slip−slip_limit≤ε

The optimization algorithm calculates the slack variable ε so that it satisfies the soft constraint inequality above and keeps the cost function J(t) minimal. To keep the J(t) minimal, $p\|\varepsilon_k\|_I^2$ must be minimal and that is the case when $\varepsilon_k$ is as close as possible to 0.

By changing the weights in the cost function, different behavior can be achieved. For example, if q is increased relative to R, the vehicle will follow yaw rate reference better, but the wheel torques might experience more aggressive changes.

As regards hard constraints, any combination of the following might be considered in a further embodiment of the present invention.

Upper and lower input limits:

$u_{low} \leq u(k) \leq u_{high}$

Upper and lower input rate limits:

$\Delta u_{low} \leq u(k) - u(k-1) \leq \Delta u_{high}$

Steering in MPC output must be the same as driver steering reference:

$u(1,k) = \delta_{ref}(k)$

First state in the optimization is the current measured state $\xi(1) = \xi_0$

LTV vehicle model equation must be satisfied in all prediction steps:

$\xi(k+1) = A_k \xi(k) + B_k u(k) + d_k$

If the driver force request is negative (driver is braking) brake twice as hard with front wheels compared to the back wheels:

u(2,k)+u(3,k)=2*(u(4,k)+u(5,k))

Sum of wheel torques multiplied with the predicted wheel velocities (total power) must be lower than the battery's discharge power limit when accelerating and higher than the charge power limit when braking with the motors:

−chargePowerLimit≤u(2:5,k)*$\hat{\xi}$(4:7,k)≤dischargePowerLimit

Slip ratio and slip angle are placed between upper and lower bounds to keep the vehicle in the stable region:

$s_{low} \leq s(k) \leq s_{upp}$ $\alpha_{low} \leq \alpha(k) \leq \alpha_{upp}$ The sum of the forces on the wheels must be as close as possible to the driver's force request (force request tracking):

$$forceRequest - \sum_{i=2}^{5} \frac{u(i,k)}{R} \geq \varepsilon$$

Once the MPC Problem is formulated as described elsewhere in this document, the problem can be passed to a Quadratic Program Solver—a software component which solves a special class of optimization problem.

In general, a Quadratic Program Solver solves an optimization problem formulated as a quadratic program:

minimize½$x^T$Px+$q^T$x subject to l≤Ax≤u

In the case of the present disclosure:

The vector x represents the optimization variables. The Solver will output the optimal values of these variables.

$x = [u_0; u_1; \ldots; u_{Nc}; \epsilon_0; \epsilon_1; \ldots; \epsilon_{Np}]$ $u_k = [T_{fl,k}, T_{fr,k}, T_{rl,k}, T_{rr,k}]$ Where $u_k$ are the torque inputs to be applied to the system, and $\epsilon_k$ are the slack variables which govern the soft constraints.

The matrix P and the vector q are calculated from the cost function formulation, described elsewhere in this document. These parameters include the yaw rate tracking, slack variable and input variable terms. The soft constraints described elsewhere in this document are also implemented through these parameters.

The matrix A and the vectors l and u are calculated from the hard constraint formulation, described elsewhere in this document. These parameters may include the vehicle model, output constraints (power and torque), initial conditions (current vehicle state) and a special affordance for regenerative braking torque split front-to-rear.

Differential torque limits that are determining the maximum differential torques allowed to be applied on the rear and the front axle may be in form of a lookup table generated offline (based on the force request).

Steering angle for the prediction horizon is predicted based on the last two values of the steering wheel angle:

$\delta(k+1) = \gamma_1 \delta(k) + \gamma_2 \delta(k-1)$

In the following, further details of the Model Predictive Controller as used in a further embodiment of the present invention will be discussed In each time sample the controller takes following inputs:

Current vehicle states ($v_x$, $v_y$, $\dot{\psi}$, $\omega_{fl}$, $\omega_{fr}$, $\omega_{rl}$, $\omega_{rr}$) and current accelerations ($a_x$, $a_y$)

Longitudinal and lateral velocities ($v_x$, $v_y$) are estimated through Vx and Vy Estimation Functionality on the PCU Yaw rate ($\dot{\psi}$) and vehicle longitudinal and lateral accelerations ($a_x$, $a_y$) are obtained from the IMU sensors Vehicle's four current wheel speeds ($\omega_{fl}$, $\omega_{fr}$, $\omega_{rl}$, $\omega_{rr}$) are coming from Wheelspeed Sensor Mapping functionality on the PCU Last two values of the steering wheel angle Power and torque limits Differential torque limits Yaw rate reference based on the predicted steering angle for the whole prediction horizon In the following, further details of the vehicle models simulation as used in a further embodiment of the present invention will be discussed.

Current vehicle states and accelerations are used as inputs in the nonlinear and linear vehicle model simulation, through which updates of all the states are obtained. Updated states and accelerations from the nonlinear model are then used as the starting point for the next loop of nonlinear and linear vehicle model simulations. The process is repeated until the whole prediction horizon is covered, i.e. until prediction of the vehicle states for both linear and nonlinear version of the model for the whole prediction horizon is achieved. Besides the vehicle states, vehicle models are using steering prediction on the whole horizon and four wheels torques as inputs as well. After the first "turning on", torques that are used to get vehicle states prediction in both vehicle models are all equal to initial values. In every next iteration of the algorithm, optimal torques from the previous iteration are used for that purpose.

The changes in velocities and yaw rate are captured by following equations:

$$dv_x = v_y\dot{\psi} + \frac{1}{m}(F_{flx} + F_{frx} + F_{rlx} + F_{rrx}),$$

$$dv_y = -v_x\dot{\psi} + \frac{1}{m}(F_{fly} + F_{fry} + F_{rly} + F_{rry}),$$

$$d\dot{\psi} = \frac{b}{I_z}(F_{fly} + F_{fry}) - \frac{c}{I_z}(F_{rly} + F_{rry}) + \frac{a}{I_z}(-F_{flx} + F_{frx} - F_{rlx} + F_{rrx}),$$

where $I_z$ is the moment of inertia around yaw z-axis.

The change in all four wheels speed is given through $$d\omega = \frac{T - rF_x}{J}.$$

Accelerations update are done through the following equations $$a_x = \frac{1}{m}(F_{flx} + F_{frx} + F_{rlx} + F_{rrx}),$$

$$a_y = \frac{1}{m}(F_{fly} + F_{fry} + F_{rly} + F_{rry})$$

Through above described simulations, matrices from the LTV model $A_k$ and $B_k$ are obtained, as well as a delta values matrix—differences in the vehicle states obtained from the nonlinear and linear model on the whole prediction horizon. Delta values are used in the objective function of the optimal control problem and are kept constant for all optimization iterations.

In the following, further details of the problem formulation and the optimization as used in a further embodiment of the present invention will be discussed.

Measurements or estimates of the current vehicle state are used to initialize the optimization problem. The Model Predictive Controller starts its planned state trajectory from the current state, and plans control inputs that produce optimal future behavior. The goal at each step is to find the optimal control sequence along the horizon which minimizes the cost function.

With varying the wheel torque inputs $u_k$ and obtaining corresponding vehicle states through the vehicle model, optimal torques are obtained as the ones where the cost function is minimal and all the constraints satisfied.

The invention claimed is:

1. A method for controlling motion of a vehicle, the method comprising:

obtaining input information on a vector related to a velocity of said vehicle;

computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the at least one wheel for controlling the motion of said vehicle, wherein:

the vector related to the velocity of said vehicle comprises at least two of: a transversal velocity of said vehicle, a longitudinal velocity of said vehicle, a yaw rate of said vehicle, and a ratio of the transversal velocity of said vehicle and the longitudinal velocity of said vehicle or any derivative or integrated quantity of the above quantities;

said input information further comprises information on a motion target of said vehicle, wherein the motion target of said vehicle is an input provided by a driver;

said input information further comprises respective angular velocities of all four wheels of the vehicle as well as a yaw rate of said vehicle;

optimizing said future trajectory includes controlling said yaw rate of said vehicle; and the trial torques to be applied to at least one wheel of said vehicle are calculated by comparing a computed future trajectory with a target trajectory, and determining whether the computed future trajectory is close to a target trajectory.

2. The method according to claim 1, comprising:

selecting the trial torques that correspond to the computed future trajectory as the target trial torques when the computed future trajectory is determined as close to the target trajectory; and when the computed future trajectory is determined as not close to the target trajectory, modifying the trial torques and comparing a computed future trajectory with a target trajectory.

3. The method according to claim 1, wherein the motion target includes input provided by a driver on at least one of a gas pedal and a braking pedal of said vehicle.

4. A vehicle configured to execute a method for controlling motion of said vehicle, the method comprising:

obtaining input information on a vector related to a velocity of said vehicle;

computing repeatably a future trajectory of said vehicle based on said input information and trial torques to be applied to at least one wheel of said vehicle for optimizing said future trajectory in view of a target vehicle motion, thereby obtaining target trial torques; and applying the obtained target trial torques to the at least one wheel for controlling the motion of said vehicle, wherein:

the vector related to the velocity of said vehicle comprises at least two of a transversal velocity of said vehicle, a longitudinal velocity of said vehicle, a yaw rate of said vehicle, and a ratio of the transversal velocity of said vehicle and the longitudinal velocity of said vehicle or any derivative or integrated quantity of the above quantities;

said input information further comprises information on a motion target of said vehicle, wherein the motion target of said vehicle is an input provided by a driver;

said input information further comprises respective angular velocities of all four wheels of the vehicle as well as a yaw rate of said vehicle;

optimizing said future trajectory includes controlling said yaw rate of said vehicle; and the trial torques to be applied to at least one wheel of said vehicle are calculated by comparing a computed future trajectory with a target trajectory, and determining whether the computed future trajectory is close to a target trajectory.

5. A device comprising an interface to a vehicle, said vehicle providing input information on a vector related to a velocity of said vehicle to said device via said interface, wherein said device is configured to:

compute repeatably a future trajectory of said vehicle based on said input information and trial torques to be applied to at least one wheel of said vehicle for optimizing said future trajectory in view of a target vehicle motion, thereby obtaining target trial torques; and output the obtained target trial torques to said vehicle to be applied to the at least one wheel for controlling the motion of said vehicle, wherein:

the vector related to the velocity of said vehicle comprises at least two of a transversal velocity of said vehicle, a longitudinal velocity of said vehicle, a yaw rate of said vehicle, and a ratio of the transversal velocity of said vehicle and the longitudinal velocity of said vehicle or any derivative or integrated quantity of the above quantities;

said input information further comprises information on a motion target of said vehicle, wherein the motion target of said vehicle is an input provided by a driver;

said input information further comprises respective angular velocities of all four wheels of the vehicle as well as a yaw rate of said vehicle;

optimizing said future trajectory includes controlling said yaw rate of said vehicle; and the trial torques to be applied to at least one wheel of said vehicle are calculated by comparing a computed future trajectory with a target trajectory, and determining whether the computed future trajectory is close to a target trajectory.

6. The device as claimed in claim 5 further comprising:

a yaw rate target calculation component adapted to calculate a yaw rate target based on a current state of the vehicle, and a model predictive control problem formulation component adapted to create a model predictive control problem suited to the vehicle's current state and desired behavior, wherein the model predictive control problem is being formulated as a finite horizon open-loop optimal control problem.

7. The device as claimed in claim 6 further comprising:

a quadratic program solver component adapted to calculate the obtained target trial torques, to be applied to at least one of the wheels of the vehicle.

* * * * *